US012143369B1

(12) United States Patent
Sanchez Rola

(10) Patent No.: US 12,143,369 B1
(45) Date of Patent: Nov. 12, 2024

(54) SYSTEMS AND METHODS FOR DYNAMICALLY CLASSIFYING BROWSER FINGERPRINTING INTO USER TRACKING AND CLOAKING

(71) Applicant: GEN DIGITAL INC., Tempe, AZ (US)

(72) Inventor: Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 429 days.

(21) Appl. No.: 17/654,014

(22) Filed: Mar. 8, 2022

(51) Int. Cl.
*H04L 9/40* (2022.01)

(52) U.S. Cl.
CPC ...... *H04L 63/0414* (2013.01); *H04L 63/1416* (2013.01); *H04L 63/145* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 2016/0092699 A1* | 3/2016 | Riva | H04L 63/0421 726/26 |
| 2017/0195353 A1* | 7/2017 | Taylor | H04L 63/1425 |
| 2017/0228541 A1* | 8/2017 | Takata | H04L 63/145 |
| 2021/0192651 A1* | 6/2021 | Groth | G06Q 30/0206 |
| 2022/0131877 A1* | 4/2022 | Oest | H04L 63/145 |

* cited by examiner

*Primary Examiner* — Atta Khan
(74) *Attorney, Agent, or Firm* — Greenberg Traurig, LLP

(57) ABSTRACT

The disclosed computer-implemented method for dynamically classifying browser fingerprinting into user tracking and cloaking may include identifying, by a computing device, one or more website scripts as one or more candidates for cloaking based on function hooking and execution attribution. The method may additionally include identifying, in response to the identification of the one or more candidates for cloaking, at least one of the candidates for cloaking that lacks a direct connection to fingerprinting based on the function hooking and the execution attribution. The method may also include classifying, in response to the identification of the at least one of the candidates for cloaking that lacks a direct connection to fingerprinting, the at least one of the candidates for cloaking based on a hierarchical analysis. The method may further include performing a security action based on the classification. Various other methods, systems, and computer-readable media are also disclosed.

20 Claims, 6 Drawing Sheets

SYSTEMS AND METHODS FOR DYNAMICALLY CLASSIFYING BROWSER FINGERPRINTING INTO USER TRACKING AND CLOAKING

BACKGROUND

Presently, browser fingerprinting techniques are in extensive use for user tracking and cloaking purposes. Browser fingerprinting is a technique that websites use to collect information about a user's browser type and version, as well as the operating system, active plugins, time zone, language, screen resolution and various other active settings. Browser fingerprinting is often used for user tracking, and websites typically employ user tracking when deciding to block browsers of users, such as web bots.

Cloaking refers to the practice of presenting different content or URLs to human users and search engines. For example, cloaking may entail serving a page of HTML text to search engines, while showing a page of images to users. Another example of cloaking is insertion of text or keywords into a page only when the user agent requesting the page is a search engine, as opposed to a human visitor. It is not uncommon for hackers to use cloaking to make a hack more difficult to detect. Cloaking can also be used for especially malicious purposes, such as Phishing attacks intended to induce individuals to reveal personal information (e.g., passwords and credit card numbers).

User tracking and cloaking are different uses of browser fingerprinting, and cloaking presents a much greater security risk than user tracking. However, although the two use cases may be different, they remain technically similar, thus presenting difficulty in differentiating the different activities. The present disclosure, therefore, identifies and addresses a need for systems and methods for dynamically classifying browser fingerprinting into user tracking and cloaking.

SUMMARY

As will be described in greater detail below, the present disclosure describes various systems and methods for dynamically classifying browser fingerprinting into user tracking and cloaking.

In one example, a method for dynamically classifying browser fingerprinting into user tracking and cloaking may include identifying, by a computing device, one or more website scripts as one or more candidates for cloaking based on function hooking and execution attribution. The method may additionally include identifying, by the computing device and in response to the identification of the one or more candidates for cloaking, at least one of the candidates for cloaking that lacks a direct connection to fingerprinting based on the function hooking and the execution attribution. The method may also include classifying, by the computing device and in response to the identification of the at least one of the candidates for cloaking that lacks a direct connection to fingerprinting, the at least one of the candidates for cloaking based on a hierarchical analysis. The method may further include performing a security action, by the computing device, based on the classification.

In some implementations of the method, the function hooking may include at least one of: hooking one or more functions or application program interfaces (APIs) used for fingerprinting; hooking one or more functions that are used to modify content of pages in a dynamic manner; or creating listeners for one or more events that log when one or more websites modify their uniform resource locator (URL) location.

In some implementations of the method, the execution attribution may include at least one of: checking timing of when different parts of a document object model (DOM) are loaded; checking timing information about one or more function calls, including at least one of a browser fingerprinting application program interface (API) call or a browser fingerprinting function call; or checking one or more stack traces of the one or more function calls and one or more events that are determined to be related to one another based on the timing information.

In some implementations of the method, the hierarchical analysis may classify the at least one of the candidates for cloaking as either cloaking or user tracking by checking a hierarchy of a page using a dynamically generated resource tree to find a connection. For example, the connection may be at least one of a parent-child or a shared-parent connection.

In some implementations, the method may further include at least one of: identifying, by the computing device, one or more website scripts as user tracking based on the function hooking and the execution attribution; or classifying, by the computing device and in response to the identification of the one or more candidates for cloaking, at least one of the candidates for cloaking as cloaking based on having a direct connection to fingerprinting based on the function hooking and the execution attribution. For example, the execution attribution may find a direct connection by: observing that a website script made one or more fingerprinting calls and subsequently at least one of: performed multiple inclusions in a document object model (DOM), or dynamically redirected a page.

In some implementations, the security action may include at least one of: informing a user about the tracking and cloaking in real time; including information about the tracking and cloaking when providing information about at least one of a website or one or more trackers; or enriching one or more privacy scores generated for privacy invasive web trackers.

In one embodiment, a system for dynamically classifying browser fingerprinting into user tracking and cloaking may include at least one physical processor and physical memory that includes computer-executable instructions that, when executed by the physical processor, cause the physical processor to identify one or more website scripts as one or more candidates for cloaking based on function hooking and execution attribution. The physical processor may additionally identify, in response to the identification of the one or more candidates for cloaking, at least one of the candidates for cloaking that lacks a direct connection to fingerprinting based on the function hooking and the execution attribution. The physical processor may also classify, in response to the identification of the at least one of the candidates for cloaking that lacks a direct connection to fingerprinting, the at least one of the candidates for cloaking based on a hierarchical analysis. The physical processor may further perform a security action based on the classification.

In some implementations, the function hooking may include at least one of: hooking one or more functions or application program interfaces (APIs) used for fingerprinting; hooking one or more functions that are used to modify content of pages in a dynamic manner; or creating listeners for one or more events that log when one or more websites modify their uniform resource locator (URL) location.

In some implementations, the execution attribution may include at least one of: checking timing of when different parts of a document object model (DOM) are loaded; checking timing information about one or more function calls, including at least one of a browser fingerprinting application program interface (API) call or a browser fingerprinting function call; or checking one or more stack traces of the one or more function calls and one or more events that are determined to be related to one another based on the timing information.

In some implementations, the hierarchical analysis may classify the at least one of the candidates for cloaking as either cloaking or user tracking by checking a hierarchy of a page using a dynamically generated resource tree to find a connection. For example, the connection may be at least one of a parent-child or a shared-parent connection.

In some implementations, the computer-executable instructions may further cause the at least one physical processor to at least one of: identify one or more website scripts as user tracking based on the function hooking and the execution attribution; or classify, in response to the identification of the one or more candidates for cloaking, at least one of the candidates for cloaking as cloaking based on having a direct connection to fingerprinting based on the function hooking and the execution attribution. For example, the execution attribution may find a direct connection by: observing that a website script made one or more fingerprinting calls and subsequently at least one of: performed multiple inclusions in a document object model (DOM), or dynamically redirected a page.

In some implementations, the security action may include at least one of: informing a user about the tracking and cloaking in real time; including information about the tracking and cloaking when providing information about at least one of a website or one or more trackers; or enriching one or more privacy scores generated for privacy invasive web trackers.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to identify one or more website scripts as one or more candidates for cloaking based on function hooking and execution attribution. The computing device may additionally identify, in response to the identification of the one or more candidates for cloaking, at least one of the candidates for cloaking that lacks a direct connection to fingerprinting based on the function hooking and the execution attribution. The computing device may also classify, in response to the identification of the at least one of the candidates for cloaking that lacks a direct connection to fingerprinting, the at least one of the candidates for cloaking based on a hierarchical analysis. The computing device may also perform a security action based on the classification.

In some implementations, the function hooking may include at least one of: hooking one or more functions or application program interfaces (APIs) used for fingerprinting; hooking one or more functions that are used to modify content of pages in a dynamic manner; or creating listeners for one or more events that log when one or more websites modify their uniform resource locator (URL) location.

In some implementations, the execution attribution may include at least one of: checking timing of when different parts of a document object model (DOM) are loaded; checking timing information about one or more function calls, including at least one of a browser fingerprinting application program interface (API) call or a browser fingerprinting function call; or checking one or more stack traces of the one or more function calls and one or more events that are determined to be related to one another based on the timing information.

In some implementations, the hierarchical analysis may classify the at least one of the candidates for cloaking as either cloaking or user tracking by checking a hierarchy of a page using a dynamically generated resource tree to find a connection.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
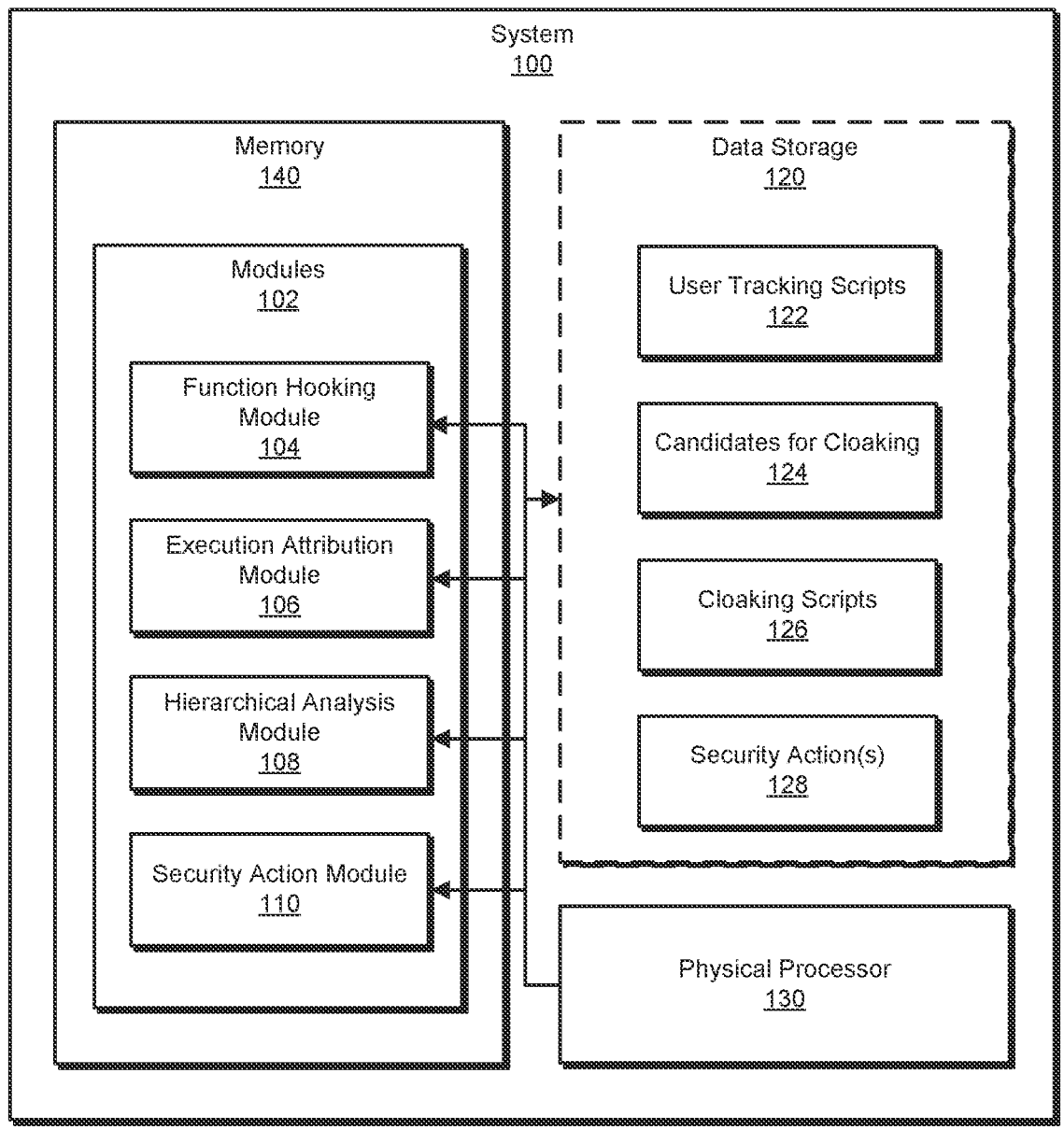
FIG. 1 is a block diagram of an example system for dynamically classifying browser fingerprinting into user tracking and cloaking.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for dynamically classifying browser fingerprinting into user tracking and cloaking. For example, the present disclosure details a dynamic classifier that identifies website scripts as candidates for cloaking based on function hooking and execution attribution. The disclosure additionally details how to identify candidates for cloaking that lack a direct connection to fingerprinting based on the function hooking and the execution attribution, and classify those candidates based on a hierarchical analysis. The disclosure further details performance of various security actions based on the classification. The disclosed techniques enable classification of website scripts that perform browser fingerprinting into user tracking and cloaking, thus enabling web browsers to perform their functions by avoiding being blocked, preventing phishing attempts, and/or addressing various other security concerns.

Figure 2:
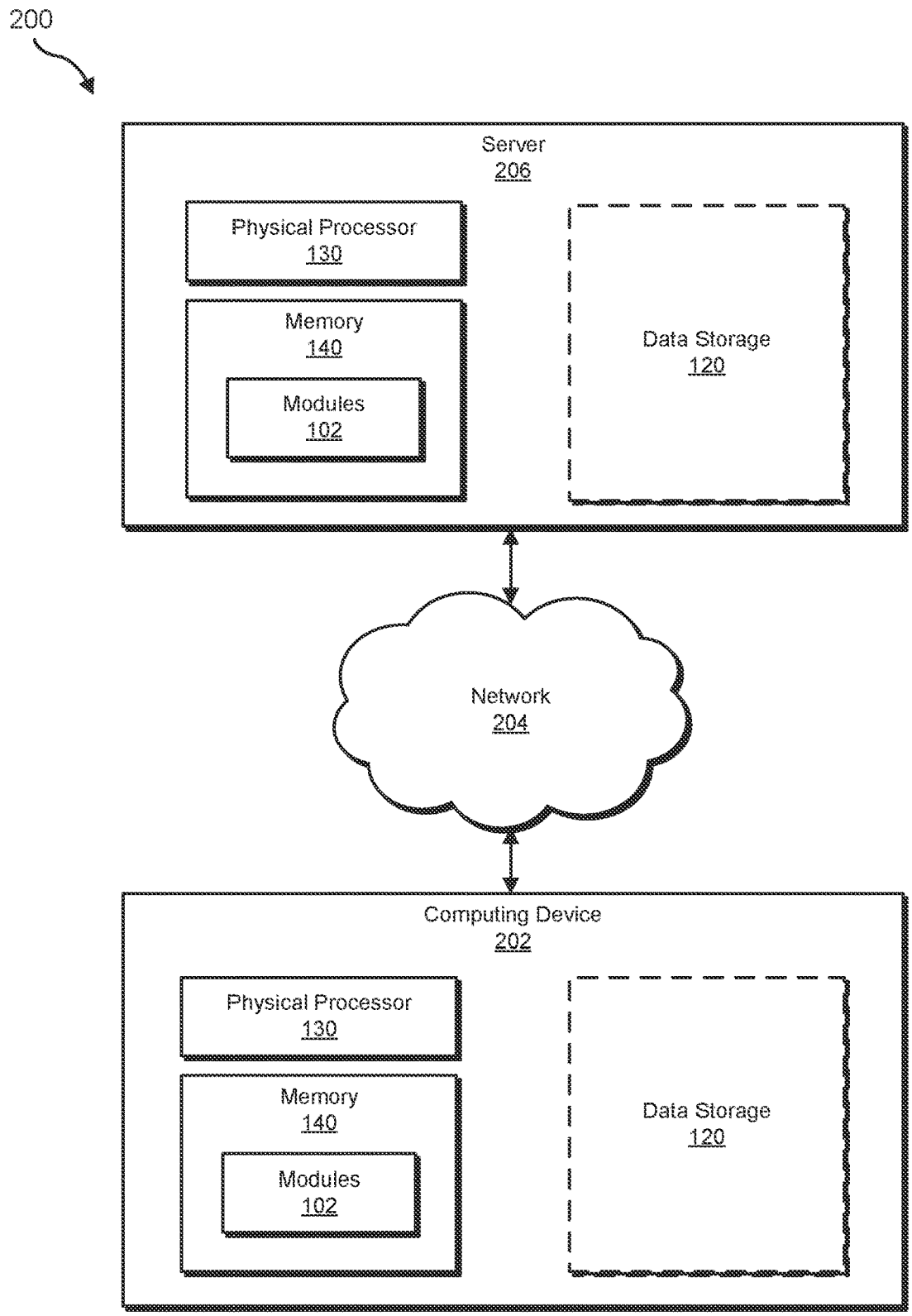
FIG. 2 is a block diagram of an additional example system for dynamically classifying browser fingerprinting into user tracking and cloaking.

The following will provide, with reference to FIGS. 1-2, detailed descriptions of example systems for dynamically classifying browser fingerprinting into user tracking and cloaking. Detailed descriptions of corresponding computer-implemented methods will also be provided in connection with FIG. 3. Detailed descriptions of operation of a dynamic classification system will further be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for dynamically classifying browser fingerprinting into user tracking and cloaking. As illustrated in this figure, example system 100 may include one or more modules 102 for performing one or more tasks. As will be explained in greater detail below, modules 102 may include a function hooking module 104, an execution attribution module 106, a hierarchical analysis module 108, and a security action module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically classifying browser fingerprinting into user tracking and cloaking. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more data structures, such as data storage 120. Data storage 120 generally represents any type or form of stored data. In one example, data storage 120 may include databases, spreadsheets, lists, matrices, trees, or any other type of data structure. Examples of data storage 120 include, without limitation, user tracking scripts 122, candidates for cloaking 124, cloaking scripts 126, and/or security actions 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to dynamically classify browser fingerprinting into user tracking and cloaking. For example, and as will be described in greater detail below, one or more of modules 102 may cause computing device 202 and/or server 206 to identify one or more website scripts as one or more candidates for cloaking based on function hooking and execution attribution. Computing device 202 and/or server 206 may additionally identify, in response to the identification of the one or more candidates for cloaking, at least one of the candidates for cloaking that lacks a direct connection to fingerprinting based on the function hooking and the execution attribution. Computing device 202 and/or server 206 may also classify, in response to the identification of the at least one of the candidates for cloaking that lacks a direct connection to fingerprinting, the at least one of the candidates for cloaking based on a hierarchical analysis. Computing device 202 and/or server 206 may further perform a security action based on the classification.

Computing device 202 generally represents any type or form of computing device capable of reading computer-executable instructions. For example, computing device 202 may correspond to any computer capable of connecting to a network and running a web browsing application. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of connecting to a network and running a web browsing application. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
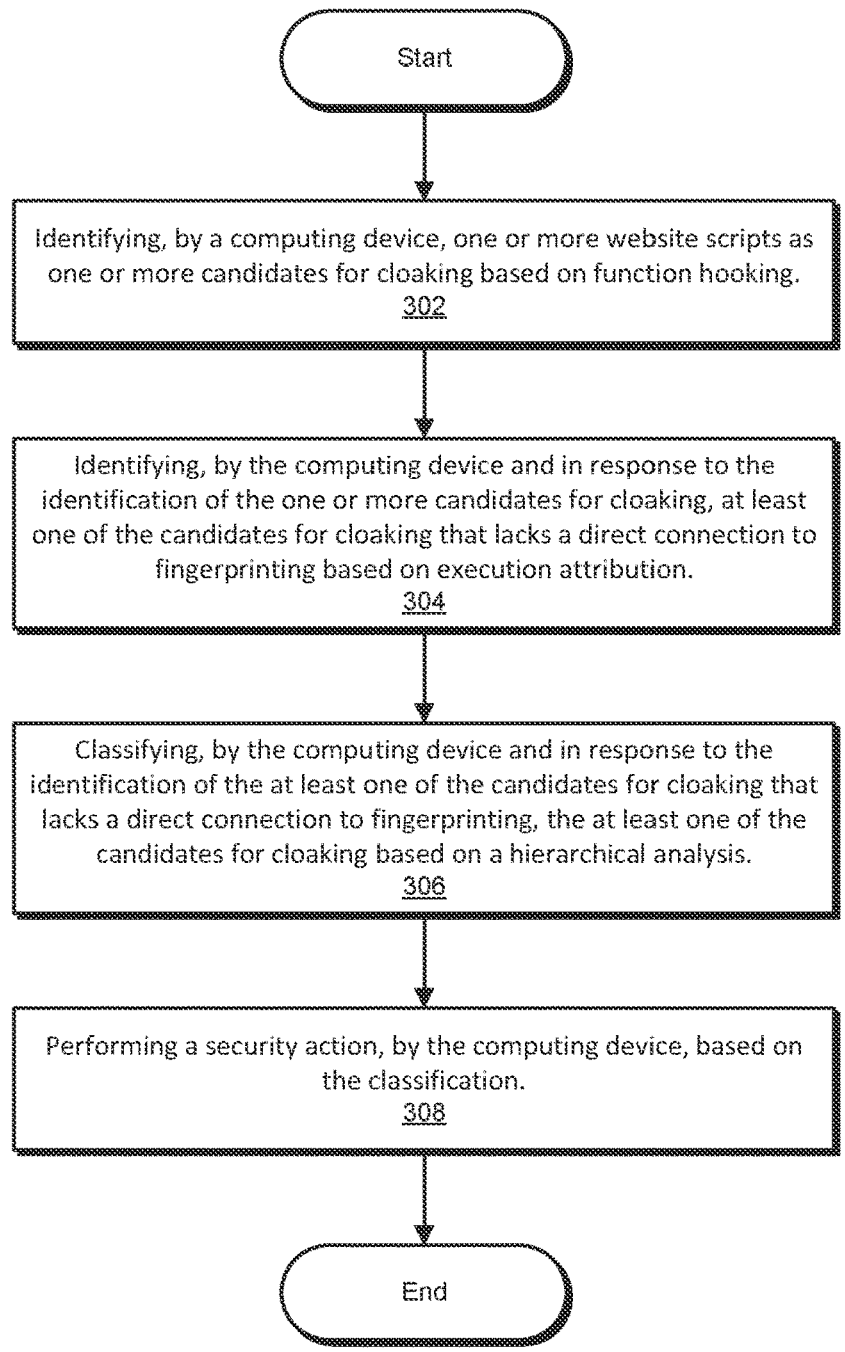
FIG. 3 is a flow diagram of an example method for dynamically classifying browser fingerprinting into user tracking and cloaking.

FIG. 3 is a flow diagram of an example computer-implemented method 300 for dynamically classifying browser fingerprinting into user tracking and cloaking. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may carry out operations that dynamically classify browser fingerprinting into user tracking and cloaking. For example, function hooking module 104 and execution attribution module 106 may, as part of computing device 202 in FIG. 2, identify one or more website scripts as one or more candidates for cloaking based on function hooking and execution attribution. Additionally or alternatively, function hooking module 104 and execution attribution module 106 may, as part of computing device 202 in FIG. 2, identify one or more website scripts as user tracking based on the function hooking and the execution attribution.

The term "website," as used herein, may generally refer to a collection of web pages and related content that is identified by a common domain name and published on at least one web server. Notable examples include, without limitation, wikipedia.org, google.com, and amazon.com. All publicly accessible websites collectively constitute the World Wide Web. There are also private websites that can only be accessed on a private network, such as a company's internal website for its employees. Websites are typically dedicated to a particular topic or purpose, such as news, education, commerce, entertainment, or social networking. Hyperlinking between web pages guides the navigation of the site, which often starts with a home page. Users can access websites on a range of devices, including desktops, laptops, tablets, and smartphones. The app used on these devices is called a web browser.

The term "script," as used herein, may generally refer to a program or sequence of instructions that is interpreted or carried out by another program rather than by the computer processor (as a compiled program is). Example scripts include, without limitation, text documents with instructions written using a scripting language that are used to generate Web pages and to automate computer processes.

The term "function," as used herein, may generally refer to a subroutine configured as a sequence of program instructions that performs a specific task, packaged as a unit. An example function, without limitation, includes a subroutine that returns a computed value to its caller (its return value), or provides various result values or output parameters.

The term "hooking," as used herein, may generally refer to a range of techniques used to alter or augment the behavior of an operating system, of applications, or of other software components by intercepting function calls, messages, or events passed between software components. Code that handles such intercepted function calls, events or messages is called a hook. Hooking may be used for many purposes including, without limitation, debugging and extending functionality. Examples may include, without limitation, intercepting keyboard or mouse event messages before they reach an application, or intercepting operating system calls in order to monitor behavior or modify the function of an application or other component.

The term "execution," as used herein, may generally refer to a process by which a computer or virtual machine reads and acts on the instructions of a computer program. For example, and without limitation, each instruction of a program may be a description of a particular action which may be carried out in order for a specific problem to be solved. Execution may involve repeatedly following a 'fetch-decode-execute' cycle for each instruction and, as the executing machine follows the instructions, specific effects may be produced in accordance with semantics of those instructions.

The term "attribution," as used herein, may generally refer to the action of regarding something as being caused by a person or thing. For example, attribution may refer, without limitation, to inferring causation of a scripted activity by another scripted activity based on positions thereof in a sequence of scripted activities.

The systems described herein may perform step 302 in a variety of ways. In one example, the function hooking may include hooking one or more functions or application program interfaces (APIs) used for fingerprinting. Alternatively or additionally, the function hooking may include hooking one or more functions that are used to modify content of pages in a dynamic manner. Additionally or alternatively, the function hooking may include creating listeners for one or more events that log when one or more websites modify their uniform resource locator (URL) location. In another example, the execution attribution may include checking timing of when different parts of a document object model (DOM) are loaded. Alternatively or additionally, the execution attribution may include checking timing information about one or more function calls, including at least one of a browser fingerprinting application program interface (API) call or a browser fingerprinting function call. Processing may proceed from step 302 to step 304.

The term "hierarchical," as used herein, may generally refer to anything of, relating to, or arranged in a ranked or ordered system or organization. For example, hierarchical may refer, without limitation, to any ranked or ordered data structure, such as a linked list, a matrix, a hash, a graph, a tree, or any other type of ordered or ranked data structure.

The term "analysis," as used herein, may generally refer to a detailed examination of the elements or structure of something. For example, analysis may refer, without limitation, to any process of breaking a complex topic or substance into smaller parts in order to gain a better understanding of it. in the context of a hierarchical analysis, the process may examine an order or rank of elements of a data structure and infer meaning or relationship therefrom to classify contents of the data structure.

The term "security action," as used herein may generally refer to any response taken by a computer upon detection of a security threat. For example, security action may refer, without limitation, to issuing an alert, enforcing a quarantine, blocking access, recording information for subsequent use by security components, adjusting a score (e.g., privacy score), etc.

The term "application program interface," as used herein, may generally refer to a connection between computers or between computer programs. It is a type of software interface, offering a service to other pieces of software. For example, application program interface may refer, without limitation, to any type of fingerprinting API capable of employing one or more fingerprinting techniques, such as canvas fingerprinting, Web GL fingerprinting, media device fingerprinting, audio fingerprinting, etc.

The term "listener," as used herein, may generally refer to an event handler that may be configured as a callback subroutine that handles inputs received in a program. For example, and without limitation, an event listener may be configured for programming logic events and/or external events. In the case of programming logic events, the listener may be configured as a hook in an event method that is called on each event firing that calls the event handler. In the case of external events, the event listener may be configured to detect event firings, often by polling one or more observables; then it may call an event handler upon detecting an event firing.

The term "document object model," as used herein, may generally refer to a cross-platform and language-independent interface that treats an XML or HTML document as a tree structure wherein each node is an object representing a part of the document. For example, and without limitation, the DOM may represent a document with a logical tree, in which elements are arranged hierarchically according to the structure of the document. The objects representing elements may have properties such as parentNode and childNodes, which may be used to navigate through this tree.

The term "timing information," as used herein, may generally refer to any type of information about one or more sequences, delays, durations, or time stamps for navigations and/or resource loading operations. For example, timing information may refer, without limitation, to an amount of time required to fetch a resource, time spent in one or more phases of a resource fetching operation, sequence of function calls, delay between function calls, etc.

The term "function call," as used herein, may generally refer to a request made by a program or script that performs a predetermined function. For example, function call may refer, without limitation, to initiation of execution of a block of code which only runs when it is called. The function call may be to a function without arguments and without return values, a function without arguments and with return values, a function with arguments and without return values, and/or a function with arguments and with return values.

At step 304, one or more of the systems described herein may carry out additional operations that dynamically classify browser fingerprinting into user tracking and cloaking. For example, execution attribution module 106 may, as part of computing device 202 in FIG. 2, identify, in response to the identification of the one or more candidates for cloaking, at least one of the candidates for cloaking that lacks a direct connection to fingerprinting based on the function hooking and the execution attribution. Alternatively or additionally, execution attribution module 106 may, as part of computing device 202 in FIG. 2, classify, by the computing device and in response to the identification of the one or more candidates for cloaking, at least one of the candidates for cloaking as cloaking based on having a direct connection to fingerprinting based on the function hooking and the execution attribution.

The systems described herein may perform step 304 in a variety of ways. In one example, the execution attribution may include checking one or more stack traces of the one or more function calls and one or more events that are determined to be related to one another based on the timing information. Additionally or alternatively, the execution attribution may find a direct connection by observing that a website script made one or more fingerprinting calls and subsequently performed multiple inclusions in a document object model (DOM) and/or dynamically redirected a page. Processing may proceed from step 304 to step 306.

The term "stack traces," as used herein, may generally refer to a report of active stack frames at a specific point in time during the execution of a program. For example, when a program is run, memory is often dynamically allocated in two places; the stack and the heap. A stack trace allows tracking the sequence of nested functions called up to the point where the stack trace is generated. End-users may see a stack trace displayed as part of an error message, which the user can then report to a programmer.

The term "page," as used herein, may generally refer to a hypertext document provided by a website and displayed to a user in a web browser. For example, and without limitation, a website typically consists of many web pages linked together in a coherent fashion. Some core elements of a web page may be one or more text files written in the Hypertext Markup Language (HTML). Many web pages also make use of JavaScript code for dynamic behavior and Cascading Style Sheets (CSS) code for presentation semantics. WebAssembly executables may also be used for portions of web page behavior. Images, videos, and other multimedia files are often embedded in web pages. Each web page may be identified by a distinct Uniform Resource Locator (URL). When the user inputs a URL into their browser, that page's elements may be downloaded from web servers. The browser may then combine all of the elements into an interactive visual representation on the user's device.

The term "inclusion," as used herein, may generally refer to change in a document object model. For example, inclusion may refer, without limitation, to addition of stylesheets, documents, or any other contents to a DOM.

The term "redirect," as used herein, may generally refer to any technique which may be used to redirect a domain's visitors to a different URL. For example, redirect may refer, without limitation, to manual redirect, an HTTP status code, a refresh metatag and HTTP refresh header, a JavaScript redirect, a frame redirect, a redirect chain, and/or a redirect loop.

At step 306, one or more of the systems described herein may carry out additional operations that dynamically classify browser fingerprinting into user tracking and cloaking. For example, hierarchical analysis module 108 may, as part of computing device 202 in FIG. 2, classify, in response to the identification of the at least one of the candidates for cloaking that lacks a direct connection to fingerprinting, the at least one of the candidates for cloaking based on a hierarchical analysis.

The systems described herein may perform step 306 in a variety of ways. In one example, the hierarchical analysis may classify the at least one of the candidates for cloaking as either cloaking or user tracking by checking a hierarchy of a page using a dynamically generated resource tree to find a connection. For example, the connection may be at least one of a parent-child or a shared-parent connection. Processing may proceed from step 306 to step 308.

The term "resource tree," as used herein, may generally refer to a set of nested objects that may be used to represent a structure of a website. For example, resources of the resource tree may include, without limitation, container resources that contain other resources, and leaf resources that do not contain other resources. A resource may have a parent resource, and two resources that share a parent resource may be considered sibling resources because they have the same parent resource. A resource that has a parent may be considered a child resource of the parent resource.

At step 308, one or more of the systems described herein may carry out additional operations that respond to and/or utilize the dynamic classification of browser fingerprinting. For example, security action module 110 may, as part of computing device 202 in FIG. 2, perform a security action based on the classification.

The systems described herein may perform step 308 in a variety of ways. In one example, the security action may include informing a user about the tracking and cloaking in real time. Additionally or alternatively, the security action may entail including information about the tracking and cloaking when providing information about at least one of a website or one or more trackers. Alternatively or additionally, the security action may include enriching one or more privacy scores generated for privacy invasive web trackers.

Figure 4:
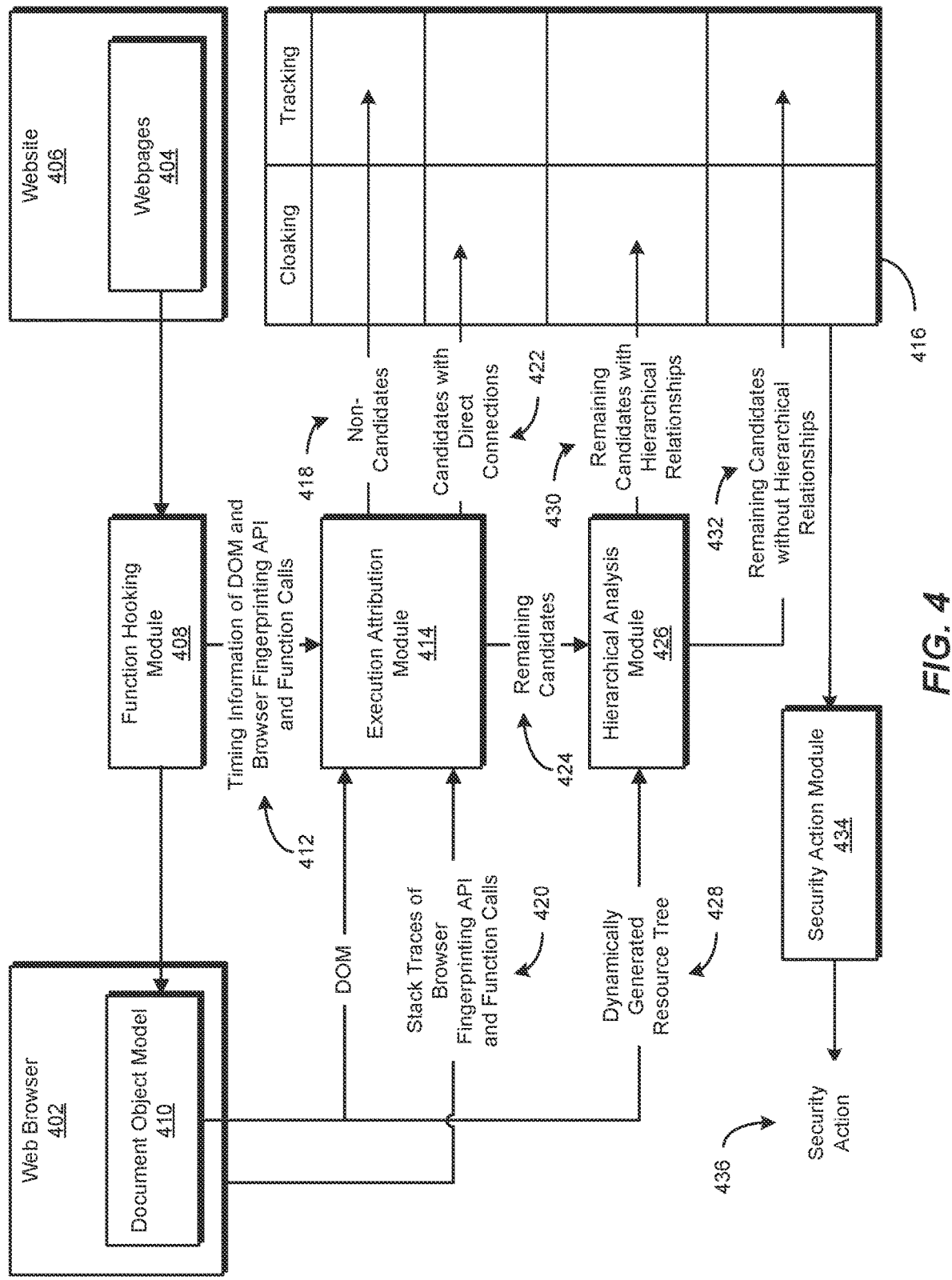
FIG. 4 is a block diagram conceptually illustrating operation of a system for dynamically classifying browser fingerprinting into user tracking and cloaking.

FIG. 4 provides an example of operation of a dynamic classification system in which a web browser 402 receives contents of webpages 404 from a website 406, and the received contents are stored in a document object model (DOM) 410. Function hooking module 408 determines timing Information of DOM and browser fingerprinting API and function calls 412 as previously described. For example, module 408 hooks different functions and APIs used for browser fingerprinting (e.g., HTMLCanvasElement.toDataURL and RTCPeerConnection). This information allows detection of whether any of the above-mentioned techniques are actually being used on the website under analysis. Next, module 408 may hook the functions that are used to modify the content of pages in a dynamic manner (e.g., Element.ReplaceChild or Node.insertBefore). Additionally, module 408 may create listeners for the different events that log when websites modify their URL location (e.g., webRequest.onCompleted or onBeforeRedirect).

Execution attribution module 414 then uses the timing information 412 of DOM and browser fingerprinting API and function calls to classify browser fingerprinting scripts that cannot be cloaking as user tracking, and identify the remaining browser fingerprinting scripts as cloaking candidates. For example, module 414 may first check the timing of when the different parts of the DOM are loaded, either statically though HTTP/HTML or dynamically using JavaScript. Then, module 414 may check the timing information about the browser fingerprinting API and function calls. Module 414 may thus classify scripts as user tracking or candidates for cloaking by differentiating between document inclusions that occurred before and after a fingerprinting stage. For example, if a large number of elements (e.g., 80%) were loaded after a script that performed browser fingerprinting calls, this script may be marked as a candidate for cloaking. Otherwise, the script that performed browser fingerprinting calls may be classified as user tracking at 418. After module 414 has already achieved some preliminary classification, module 414 may check the stack traces 420 of all the different calls and related events. This information allows module 414 to correlate the scripts involved in the different calls, both related to inclusions and fingerprinting. Module 414 may detect that a certain script made some fingerprinting calls, and afterwards performed multiple inclusions in the DOM or dynamically redirected the page. Module 414 may mark those specific calls as cloaking at 422.

For the remaining candidates 424 that do not have a direct connection, hierarchical analysis module 426 may classify them based on a hierarchical analysis of a dynamically generated resource tree 428. For example, module 426 may look for a parent-child or shared-parent connection. If module 426 detects that a script included both of the scripts that performed each of the groups described, module 426 may classify that script as cloaking at 430. However, if module 426 finds no such connection, module 426 can mark the script as user tracking at 432.

Security action module 434 may act on the collected classification information 416 by performing one or more security actions 436. For example, module 434 may inform a user about these situations in real time (e.g., implementing a light-weight version of the approach in an extension or custom browser). Alternatively or additionally, module 434 may include the classifications when providing information about certain websites or trackers and/or enrich the privacy scores generated for privacy invasive web trackers.

The present disclosure has detailed systems and methods for dynamically classifying browser fingerprinting into user tracking and cloaking. For example, the present disclosure has described a dynamic classifier that identifies website scripts as candidates for cloaking based on function hooking and execution attribution. The disclosure has additionally detailed how to identify candidates for cloaking that lack a direct connection to fingerprinting based on the function hooking and the execution attribution, and classify those candidates based on a hierarchical analysis. The disclosure has further detailed performance of various security actions based on the classification. For the reasons previously described, the disclosed techniques enable classification of website scripts that perform browser fingerprinting into user tracking and cloaking, thus web browser functionality by avoiding blocking by websites, preventing phishing attempts, and/or addressing various other security concerns.

Figure 5:
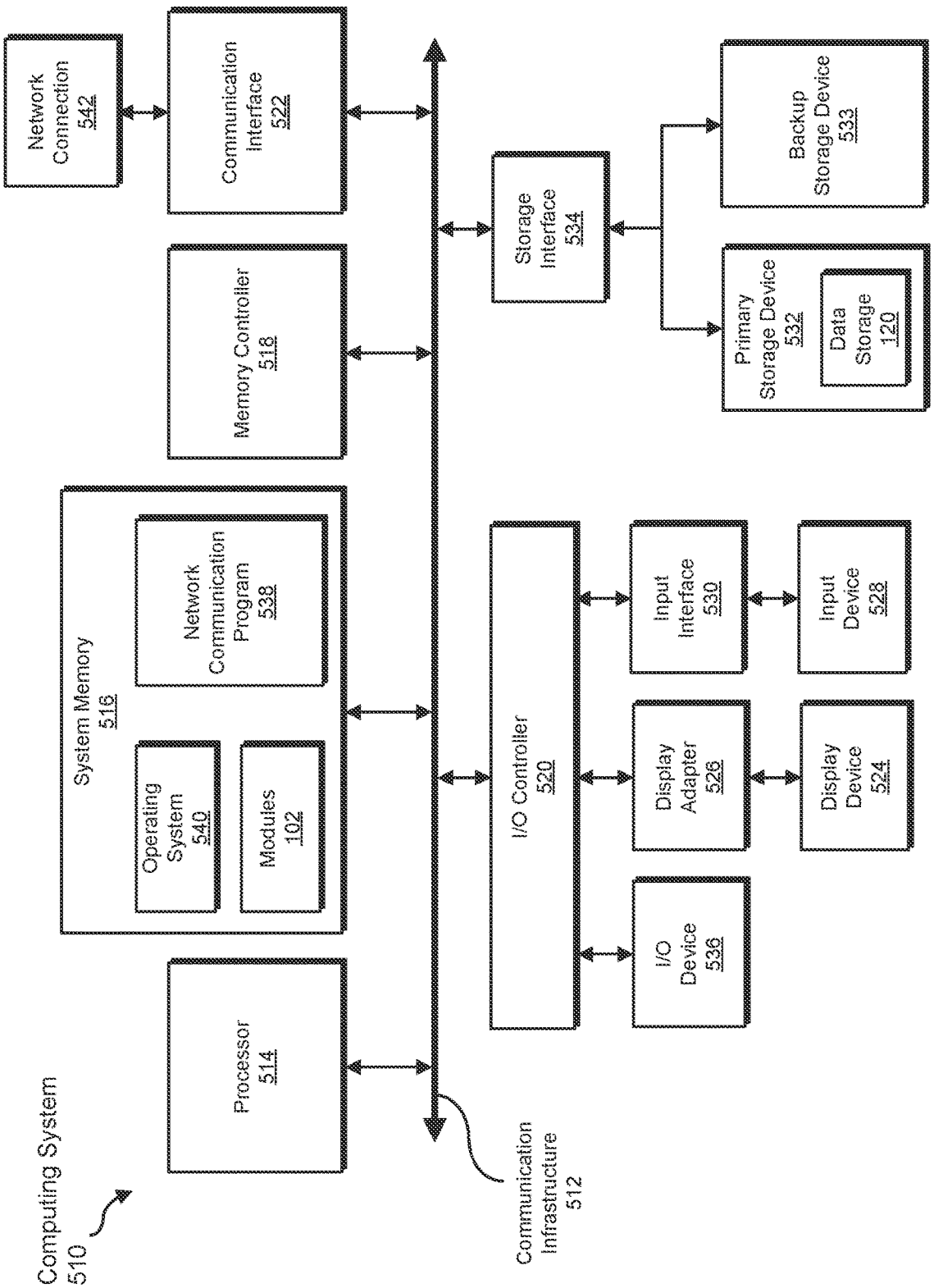
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data storage 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
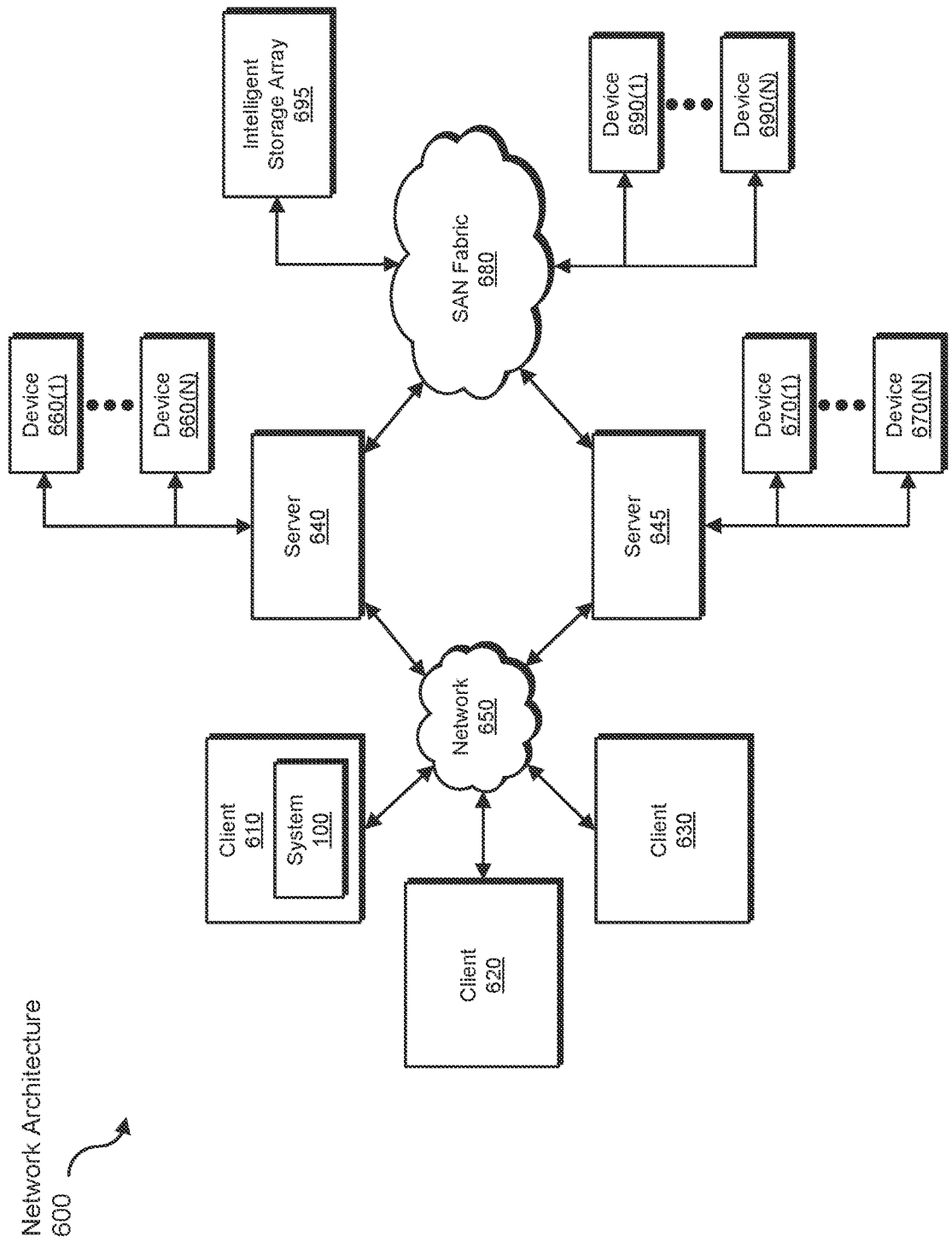
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for dynamically classifying browser fingerprinting into user tracking and cloaking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive web page contents and calls from browsing fingerprinting scripts to be transformed, transform the contents and scripts, output a result of the transformation to classify the scripts, and use the result of the transformation to perform one or more security actions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically classifying browser fingerprinting into user tracking and cloaking, at least a portion of the method being performed by a computing device comprising at least one processor, the method comprising:
   identifying, by the computing device, one or more website scripts as one or more candidates for cloaking based on function hooking and execution attribution;
   identifying, by the computing device and in response to the identification of the one or more candidates for cloaking, at least one of the candidates for cloaking that lacks a direct connection to fingerprinting based on the function hooking and the execution attribution;
   classifying, by the computing device and in response to the identification of the at least one of the candidates for cloaking that lacks a direct connection to fingerprinting, the at least one of the candidates for cloaking based on a hierarchical analysis; and
   performing a security action, by the computing device, based on the classification.

2. The method of claim 1, wherein the function hooking includes at least one of:
   hooking one or more functions or application program interfaces (APIs) used for fingerprinting;
   hooking one or more functions that are used to modify content of pages in a dynamic manner; or
   creating listeners for one or more events that log when one or more websites modify their uniform resource locator (URL) location.

3. The method of claim 1, wherein the execution attribution includes at least one of:
   checking timing of when different parts of a document object model (DOM) are loaded;
   checking timing information about one or more function calls, including at least one of a browser fingerprinting application program interface (API) call or a browser fingerprinting function call; or
   checking one or more stack traces of the one or more function calls and one or more events that are determined to be related to one another based on the timing information.

4. The method of claim 1, wherein the hierarchical analysis classifies the at least one of the candidates for cloaking as either cloaking or user tracking by checking a hierarchy of a page using a dynamically generated resource tree to find a connection.

5. The method of claim 4, wherein the connection is at least one of a parent-child or a shared-parent connection.

6. The method of claim 1, further comprising at least one of:
   identifying, by the computing device, one or more website scripts as user tracking based on the function hooking and the execution attribution; or
   classifying, by the computing device and in response to the identification of the one or more candidates for cloaking, at least one of the candidates for cloaking as cloaking based on having a direct connection to fingerprinting based on the function hooking and the execution attribution.

7. The method of claim 6, wherein the execution attribution finds a direct connection by:
  observing that a website script made one or more fingerprinting calls and subsequently at least one of:
    performed multiple inclusions in a document object model (DOM), or
    dynamically redirected a page.

8. The method of claim 1, wherein the security action includes at least one of:
  informing a user about the tracking and cloaking in real time;
  including information about the tracking and cloaking when providing information about at least one of a website or one or more trackers; or
  enriching one or more privacy scores generated for privacy invasive web trackers.

9. A system for dynamically classifying browser fingerprinting into user tracking and cloaking, the system comprising:
  at least one physical processor;
  physical memory comprising computer-executable instructions that, when executed by the physical processor, cause the physical processor to:
    identify one or more website scripts as one or more candidates for cloaking based on function hooking and execution attribution;
    identify, in response to the identification of the one or more candidates for cloaking, at least one of the candidates for cloaking that lacks a direct connection to fingerprinting based on the function hooking and the execution attribution;
    classify, in response to the identification of the at least one of the candidates for cloaking that lacks a direct connection to fingerprinting, the at least one of the candidates for cloaking based on a hierarchical analysis; and
    perform a security action based on the classification.

10. The system of claim 9, wherein the function hooking includes at least one of:
  hooking one or more functions or application program interfaces (APIs) used for fingerprinting;
  hooking one or more functions that are used to modify content of pages in a dynamic manner; or
  creating listeners for one or more events that log when one or more websites modify their uniform resource locator (URL) location.

11. The system of claim 9, wherein the execution attribution includes at least one of:
  checking timing of when different parts of a document object model (DOM) are loaded;
  checking timing information about one or more function calls, including at least one of a browser fingerprinting application program interface (API) call or a browser fingerprinting function call; or
  checking one or more stack traces of the one or more function calls and one or more events that are determined to be related to one another based on the timing information.

12. The system of claim 9, wherein the hierarchical analysis classifies the at least one of the candidates for cloaking as either cloaking or user tracking by checking a hierarchy of a page using a dynamically generated resource tree to find a connection.

13. The system of claim 12, wherein the connection is at least one of a parent-child or a shared-parent connection.

14. The system of claim 9, the computer-executable instructions further cause the at least one physical processor to at least one of:
  identify one or more website scripts as user tracking based on the function hooking and the execution attribution; or
  classify, in response to the identification of the one or more candidates for cloaking, at least one of the candidates for cloaking as cloaking based on having a direct connection to fingerprinting based on the function hooking and the execution attribution.

15. The system of claim 14, wherein the execution attribution finds a direct connection by:
  observing that a website script made one or more fingerprinting calls and subsequently at least one of:
    performed multiple inclusions in a document object model (DOM), or
    dynamically redirected a page.

16. The system of claim 9, wherein the security action includes at least one of:
  informing a user about the tracking and cloaking in real time;
  including information about the tracking and cloaking when providing information about at least one of a website or one or more trackers; or
  enriching one or more privacy scores generated for privacy invasive web trackers.

17. A non-transitory computer-readable medium comprising one or more computer-executable instructions that, when executed by at least one processor of a computing device, cause the computing device to:
  identify one or more website scripts as one or more candidates for cloaking based on function hooking and execution attribution;
  identify, in response to the identification of the one or more candidates for cloaking, at least one of the candidates for cloaking that lacks a direct connection to fingerprinting based on the function hooking and the execution attribution;
  classify, in response to the identification of the at least one of the candidates for cloaking that lacks a direct connection to fingerprinting, the at least one of the candidates for cloaking based on a hierarchical analysis; and
  perform a security action based on the classification.

18. The non-transitory computer-readable medium of claim 17, wherein the function hooking includes at least one of:
  hooking one or more functions or application program interfaces (APIs) used for fingerprinting;
  hooking one or more functions that are used to modify content of pages in a dynamic manner; or
  creating listeners for one or more events that log when one or more websites modify their uniform resource locator (URL) location.

19. The non-transitory computer-readable medium of claim 17, wherein the execution attribution includes at least one of:
  checking timing of when different parts of a document object model (DOM) are loaded;
  checking timing information about one or more function calls, including at least one of a browser fingerprinting application program interface (API) call or a browser fingerprinting function call; or
  checking one or more stack traces of the one or more function calls and one or more events that are determined to be related to one another based on the timing information.

20. The non-transitory computer-readable medium of claim 17, wherein the hierarchical analysis classifies the at least one of the candidates for cloaking as either cloaking or user tracking by checking a hierarchy of a page using a dynamically generated resource tree to find a connection.

\* \* \* \* \*